April 14, 1942.  J. C. SHANNON  2,279,895
MINERAL SEPARATOR
Filed March 1, 1939  4 Sheets-Sheet 1
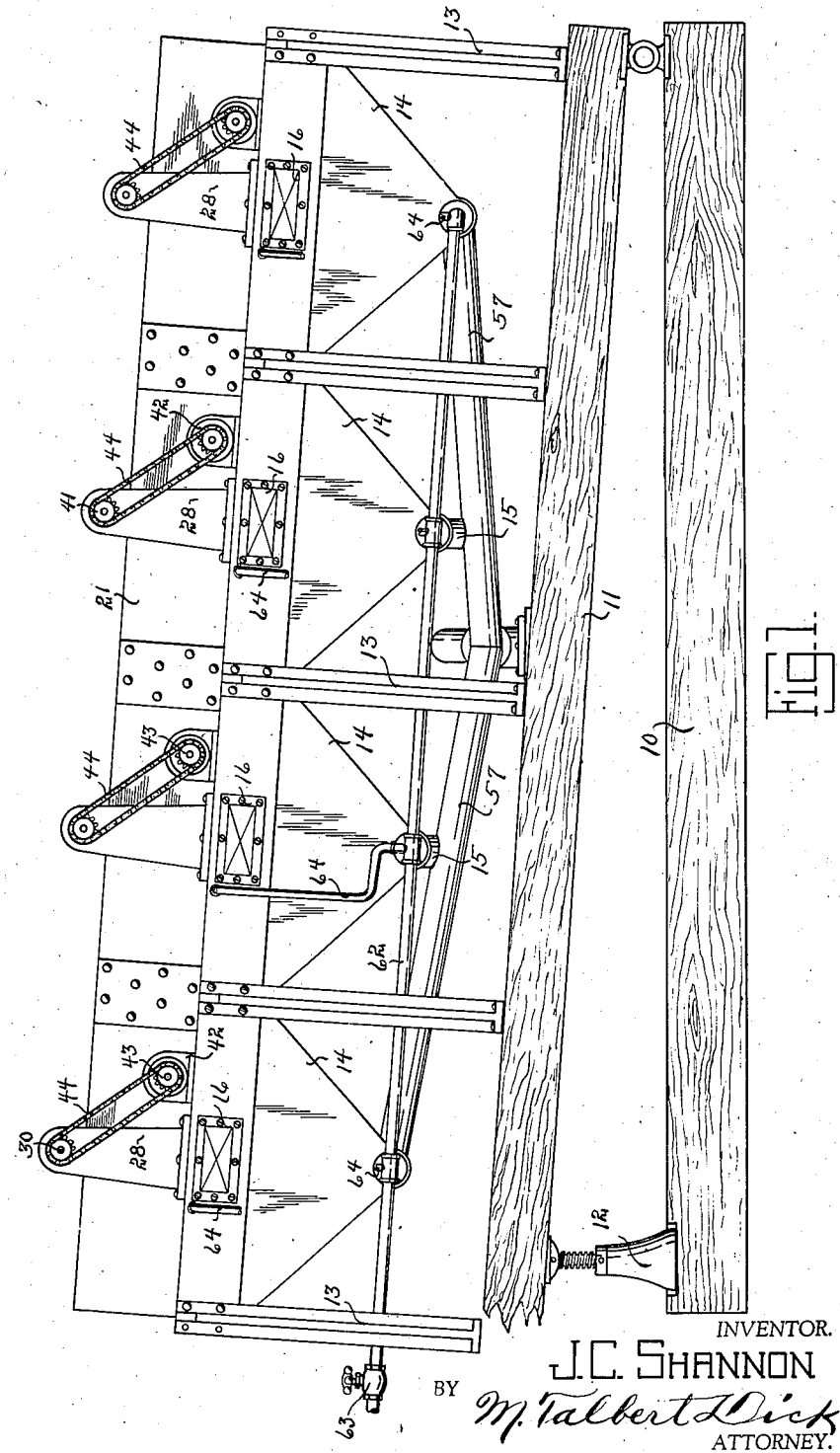
INVENTOR.
J.C. SHANNON
BY M. Talbert Dick
ATTORNEY.

April 14, 1942.   J. C. SHANNON   2,279,895
MINERAL SEPARATOR
Filed March 1, 1939   4 Sheets-Sheet 2
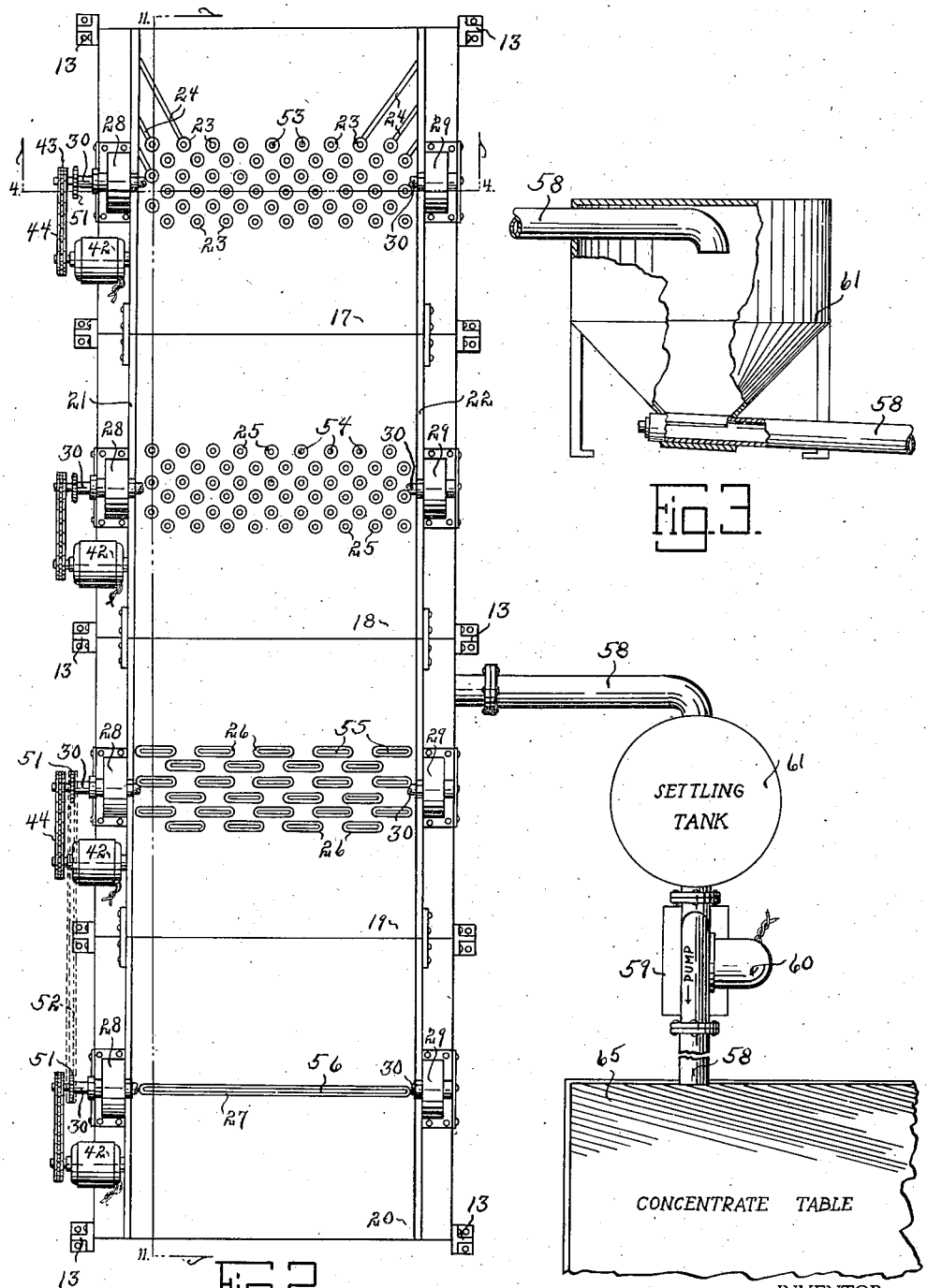

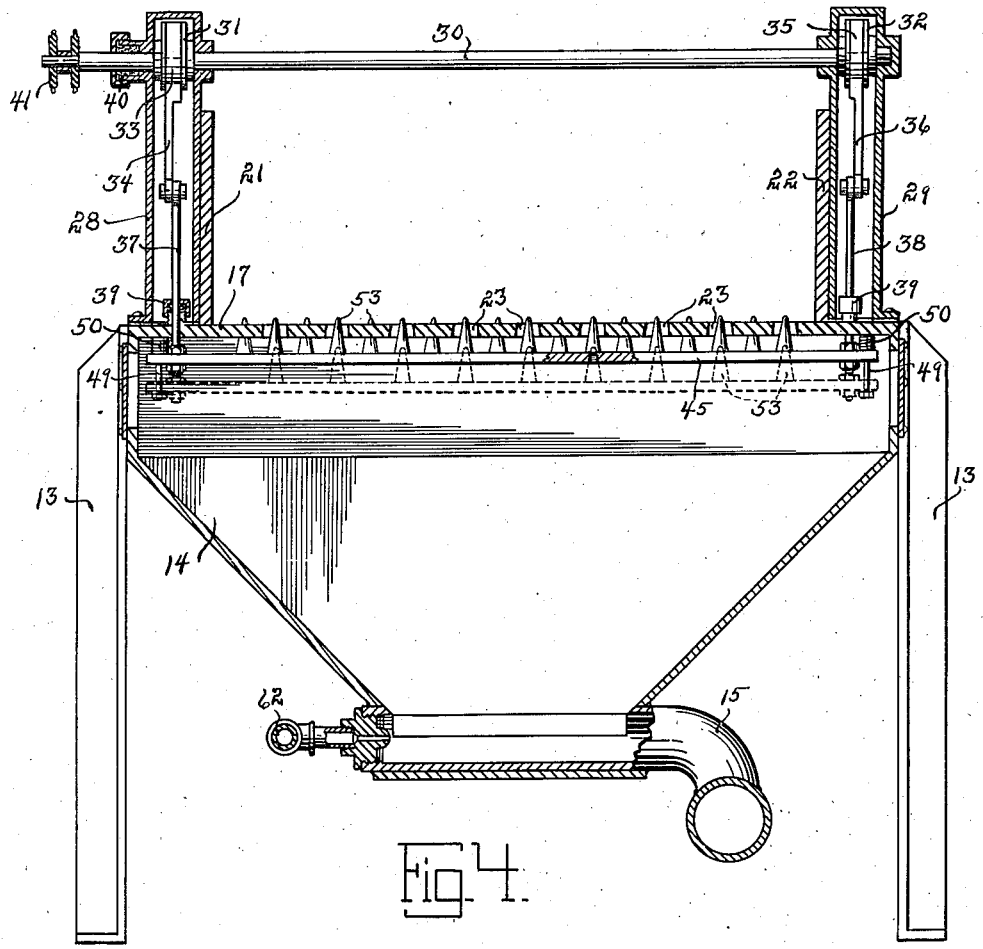
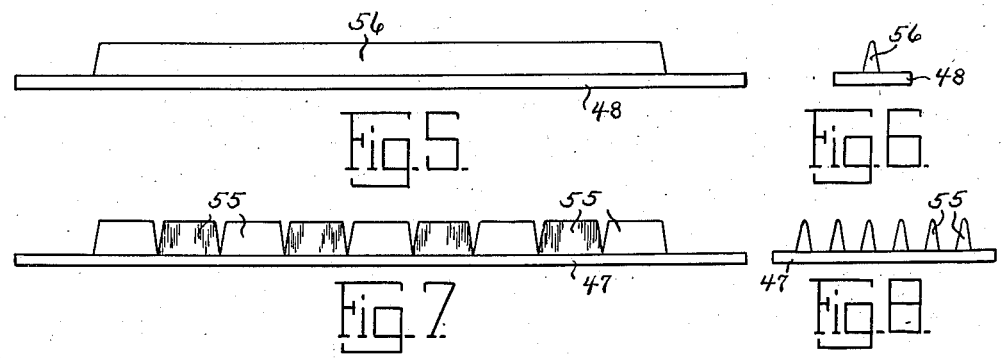

April 14, 1942. J. C. SHANNON 2,279,895
MINERAL SEPARATOR
Filed March 1, 1939 4 Sheets-Sheet 4

INVENTOR.
J. C. SHANNON
BY M. Talbert Dick
ATTORNEY.

Patented Apr. 14, 1942

2,279,895

UNITED STATES PATENT OFFICE 2,279,895

MINERAL SEPARATOR

Joseph C. Shannon, Alma, Colo.

Application March 1, 1939, Serial No. 259,162

3 Claims. (Cl. 209—458)

This invention relates chiefly to the art of recovery of precious minerals such as gold from undesirable foreign materials such as sand, gravel, and like.

The principal object of my invention is to provide a more efficient method of salvaging or retrieving free gold, metal bearing sands, metal bearing gravels and like from which is generally known as placer deposits.

More specifically, the principal object of my invention is to provide an apparatus that will successfully recover mineral values from the tailings of waste material existing from known gold recovery machines now in general use.

A still further object of my invention is to provide an apparatus that will economically recover said precious minerals that is not possible of economic recovery with present day known equipment.

A still further object of this invention is to provide an apparatus for use in the recovery and separation of materials, that is capable of continuous operation and is self-cleaning and nonclogging.

A still further object of my invention is to provide an apparatus for use in the field of precious metal recovery machines that is economical in manufacture, compact, and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a side view of the major portion of my apparatus ready for use.

Fig. 2 is a top plan view of my device and more fully illustrates its construction.

Fig. 3 is an enlarged side sectional view of a settling tank that may be used in the equipment if desired.

Fig. 4 is a cross sectional view of the major portion of my device and is taken on line 4—4 of Fig. 2.

Fig. 5 is an enlarged end view of one of the agitating bars used in the apparatus.

Fig. 6 is an end view of the member shown in Fig. 5.

Fig. 7 is an enlarged side view of still another agitating bar having a plurality of teeth thereon and used in the apparatus.

Fig. 8 is an end view of the member shown in Fig. 7.

It is a well established fact that in the process of disintegration and erosion of the mineral bearing ore bodies which produce what we now know as placer deposits, that a large percentage of precious metal values remain in physical and chemical union with other elements in the form of ore. The ore of these placer deposits is therefore intermingled with free gold and other precious metals and up to the present time, no known method has been conceived which would recover substantially all of these values in an economical manner. Usually the operators in attempting to recover gold from such deposits have confined their efforts merely to the recovery of free metallic gold and permitted the other values contained in this ore to escape with the tailings in waste from the dredging apparatus. It is for this reason that there are vast areas of placer deposits containing these certain classes of values in paying quantities, yet under present operating methods of gold recovery such deposits cannot be worked profitably. My apparatus is designed especially to operate in placer deposit ore, recover such values that cannot now be recovered economically and also to recover certain of the fine gold that escapes the riffles of the present dredging and recovery machines. However, as will later be brought out, although my apparatus is particularly designed to process the escaping tailings and waste from present used dredging recovery equipment, it may be successfully used in virgin placer deposits where the ore is directly placed in my equipment without first being run through the present known recovery apparatus.

Figure 9:
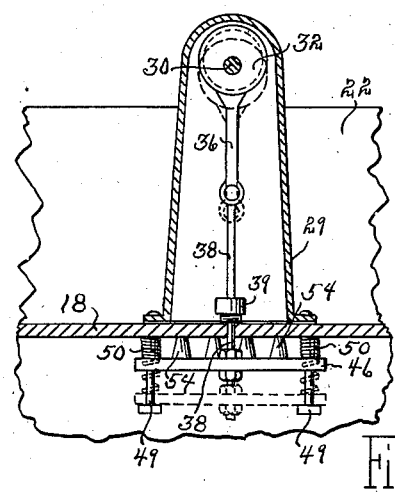
Fig. 9 is an enlarged side view of one of the eccentrically operated portions of my equipment.
Figure 10:
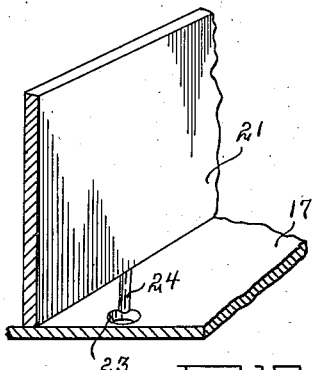
Fig. 10 is an enlarged perspective view of a portion of the trough runway portion of the apparatus.
Figure 11:
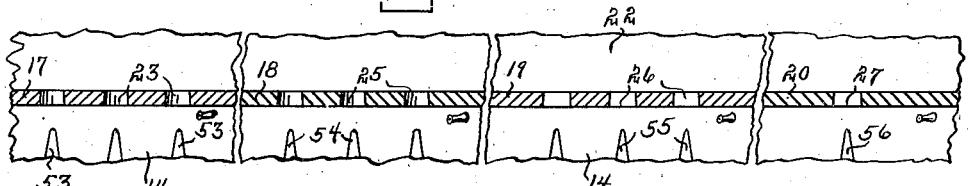
Fig. 11 is an enlarged cross sectional view of a portion of the major part of my device taken on line 11—11 of Fig. 2.
Figure 12:
Fig. 12 is an enlarged side view of one of the reciprocating spikes used in the device.
Figure 13:
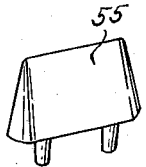
Fig. 13 is a perspective view of one of the reciprocating teeth used in the device.
Figure 14:
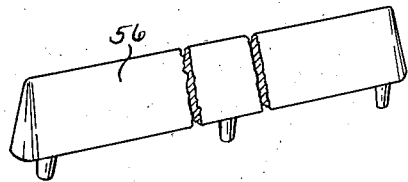
Fig. 14 is an enlarged perspective view of one of the reciprocating wedge bars used in the device.
Figure 15:
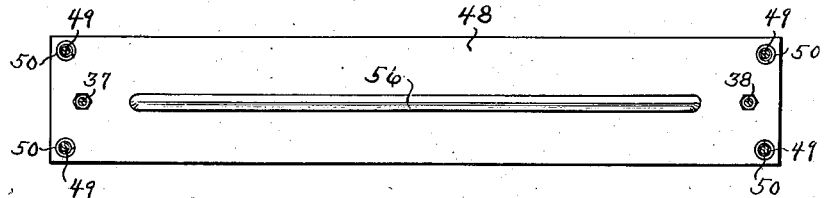
Fig. 15 is an enlarged top plan view of one of the plates used in the device.

Referring to the drawings, I have used the numeral 10 to designate the base portion or foundation of my apparatus. This member 10 may be mounted on a suitable foundation, float or like. The numeral 11 designates a platform hingedly secured at one end to the member 10 and capable of having its other end adjustably supported and secured to the member 10 by a jack or like 12. By this arrangement, the platform 11 may be held and supported at an adjustable angle to the member 10. The numeral 13 designates a frame structure secured to the top of the platform 11 for holding and supporting a plurality of tank-hopper elements 14 as shown in Fig. 1. These hopper elements each have their lower portions tapering downwardly and inwardly and communicating with outlet pipes 15 as shown in Fig. 4. These hopper-tanks 14 are arranged in rows and have their upper outer side portions extending in vertical planes. The numeral 16 designates detachable inspection plates on these vertical portions of the hopper tanks 14. In the drawings, I show four of these hopper tanks but I do not limit myself to any number inasmuch as in certain instances one hopper-tank element and associated mechanism may be used while in other cases a great number of units may be desirable. The tops of these hopper-tank elements are closed by top plate members which I have designated by the numerals 17, 18, 19, and 20 as shown in Fig. 2. Secured by suitable means on top of these top plates are two spaced apart vertically extending side wall elements 21 and 22. These side walls 21 and 22 are positioned some distance from the two sides of the row of hopper tanks rigidly as shown in Fig. 2 and with the plates 17, 18, 19 and 20 provide a trough runway over the longitudinal center portion of the major portion of the apparatus. The numeral 23 designates a plurality of holes in the plate 17 and arranged between the two members 21 and 22. The numeral 24 designates a plurality of grooves in the plate 17 extending rearwardly and inwardly to connect with certain of the holes 23 as shown in Fig. 2. These grooves 24 extend at an angle from the two side members 21 and 22 respectively and connect with some of the forward positioned holes 23 and are for the purpose of guiding and encouraging the incoming material to be processed toward the center of the trough and away from the side wall members 21 and 22. The numeral 25 designates a similar plurality of holes in the plate 18 and positioned between the side members 21 and 22. The holes 23 and 25 are tapered so that their exit ends at the bottom of the plate are of greater diameters than the diameters of their entrance ends at the top of the plates. The numeral 26 designates a plurality of spaced apart slot openings in the plate 19 and positioned between the side members 21 and 22. The numeral 27 designates an elongated slot opening in the plate 20 and positioned between the side members 21 and 22. These slots 26 and slot 27 extend transversely of the longitudinal axis of the apparatus as shown in Fig. 2. On each of the plates 17, 18, 19 and 20 and at the outer side of the side member 21 is a housing 28. Diametrically opposite from each of these housings 28 and on the outer side of the side member 22 is a housing 29. These housings 28 and 29 may be secured by any suitable means to the top plates and extend to a height above the side members 21 and 22 as shown in Fig. 4. By this construction, each of the top plates will have a pair of housings and these housings will be outside of the trough created by that plate in the side members. The numeral 30 designates a shaft rotatably mounted and extending through the upper portion of each of the housings 28 and journalled in an oppositely positioned housing 29 as shown in Fig. 4. The numeral 31 designates an eccentric in each of the housings 28 and mounted on the shaft 20, that extends through that housing. The numeral 32 designates an eccentric in each of the housings 29 and mounted on the shaft 30 that extends into such housing. The numeral 33 designates an eccentric collar embracing each of the eccentrics 31. Each of these eccentric collars 33 has an arm 34 extending downwardly within the housing in which it operates. The numeral 35 designates an eccentric collar rotatably embracing each of the eccentrics 32. Each of these sleeve collars 35 has a downwardly extending arm 36 extending downwardly within the housing in which the eccentric collar operates. The numeral 37 designates a shaft having its upper end secured to each of the arms 34. The numeral 38 designates a similar shaft similarly secured to each of the arms 36. These shafts 37 and 38 extend downwardly and slidably through the top plates as shown in Fig. 4. Obviously when the shafts 30 are rotated, these shafts 37 and 38 will be reciprocated and as they extend downwardly within the hopper-tanks 14, they may each have packing gland nut assemblies 39 to prevent leakage between the insides of the hopper-tanks and the insides of the housings 28 and 29. In like manner, packing gland nut assemblies 40 may be used on the shafts 30 where they pass through the housing. The numeral 41 designates a sprocket gear wheel rigidly secured on each of the shafts 30. The numeral 42 designates a prime mover operatively secured on each of the plates 17, 18, 19 and 20. The numeral 43 designates a sprocket wheel operatively connected to each of the prime movers. The numeral 44 designates an endless chain embracing each sprocket gear wheel 41 and gear wheel 43 of one of the prime movers as shown in Fig. 1. Any type of a prime mover or prime movers may be embraced to rotate the shafts 30. The numeral 45 designates a plate bar spaced apart from and directly below the holes 23 in the plate 17. The numeral 46 designates a similar plate bar spaced apart from and directly below the holes 25 in the plate 18. The numeral 47 designates a similar plate bar spaced apart from and directly below the slot openings 26 in the plate 18. The numeral 48 designates a similar plate bar spaced apart from and directly below the slot 27 in the plate 20. Each of these plate bars extend transversely of the longitudinal axis of the apparatus and movably vertically supported by four headed pins 49 secured to the top plates respectively as shown in Fig. 9 and Fig. 15. Each of these headed pins 49 extend downwardly at right angles to the plates to which they are secured and as they extend through the bar plates 45, 46, 47 and 49, the bar plates are capable of limited sliding movement toward or away from the top plates above them. The numeral 50 designates a coil spring embracing each of the headed supporting pins 49 and bearing downwardly on the tops of the supported bar plates. By this construction, the bar plates are yieldingly held against movement toward the top plates above them. Each of the bar plates have their two ends connected to a pair of vertically reciprocating shafts 37 and 38 as shown in Fig. 4. By this arrangement when the shafts 30 are rotated, the four bar plates 45, 46, 47, and 48 will move upwardly and downwardly relative to the top plates. These bar plates are obviously parallel with the top plates, and their reaction is always in the same planes due to the guiding and holding pins 49. The springs 50 give a cushioning effect to the reciprocation of these bar plates, reduces noise and aids compensating for certain wear and tear of the valves associated parts. On all of these shafts 30, I have placed an additional sprocket wheel 51. In case of a breakage or the failure of a motor, the failing motor or part may be cut out of the line and two of the shafts 30 connected together by a chain 52 as shown by dotted lines in Fig. 2. The numeral 53 designates a plurality of tapered cone shaped spikes mounted on the plate bar 45. These spikes 53 are the same number as the number of the holes 23 and are of like arrangement and are positioned directly below the holes 23 respectively so that when the plate bar 45 is moved upwardly, these spikes will extend through the holes 23 as shown in Fig. 4. When the plate bar 45 is in a lowered position as shown by dotted lines in Fig. 4, the spikes 53 will be spaced apart from and substantially below the plate 17. The numeral 54 designates similar spikes mounted on the plate 46 and extending upwardly in like manner to extend through the holes 25 in the plate 18 when the plate bar 46 is in an extreme elevated position. The numeral 55 designates a plurality of wedge shaped bar teeth on the plate 47. These teeth 55 are of the same number as the number of the slot openings 26 and are so arranged on the bar plate 47 and when the bar plate 47 is moved upwardly, these teeth 55 will extend through the slot openings 26. The numeral 56 designates an elongated taper rigid bar on the upper surface of the plate 48 and positioned directly below the elongated slot opening 27. In like manner, when the plate bar 48 is elevated, this bar 56 will have its upper end portion extending through the elongated slot opening and in the plane 20. By such construction, when the shafts 30 are rotating, the spikes 43 and 44, the teeth 55 and the bar 56 will move upwardly and downwardly with the plates and into and out of the holes 23 and 25, the slot openings 26 and the elongated slot opening 27. The pipes 15 extending from the inside bottom of each of the hopper-tanks 14 have their forward end portions communicating with the inside of a collecting pipe 57 which in turn communicates with the outlet pipe 58. This pipe 58 empties onto an ordinary concentrate table such as is now generally used in the recovery of certain minerals such as gold. Imposed in this pipe 58 is a pump 59 operated by a prime mover 60. Also a settling tank 61 may be imposed in the pipe 58 as shown in Fig. 2 and Fig. 3. The numeral 62 designates a pipe designed to be in communication with a supply of water under pressure and communicating with the inside bottom of each of the hopper-tanks 14. This water under pressure may be used when desired and if needed by the operation of the valve 63 imposed in the pipe 62 for aiding and washing the passage of material collected in the hopper-tanks 14 through the pipes 15. Under certain circumstances, materials may undesirably collect and pack in the upper surface of the bar plates 45, 46, 47 and 48, and therefore, I have provided pipes 64 communicating with the inside tops of the hopper-tanks 14 and the inside of the water pipe 62. By this construction, water under pressure may be forced into the upper portions of the tanks 14 for washing material from the upper surfaces of the plate bars.

The practical operation of the apparatus is as follows: The material to be processed is first deposited on the forward part of the plate 17 from which it passes over the plates 18, 19, and 20 between the two side walls 21 and 22. In the case of gold recovery, the oncoming material may come from a dredging recovery apparatus or it may come directly from the placer deposit. In any event, this sand, gravel, ore and mineral matter is in the presence of a substantial body of flowing water which aids and acts as a vehicle in forcing, guiding, and flowing the material downwardly and over the plates 17, 18, 19, and 20. This idea of flowing the water and material down a runway is not a new idea but in devices herebefore used, riffles or other projections or bars are placed along the runway to collect the desired valuable material. These bars or riffles produce a turbulence in the flow of the material and, therefore, operate almost diametrically opposite from the method of operation of my device. In my apparatus, the plates 17, 18, 19 and 20 rest in the same plane and are substantially smooth on top so that the material and water as it flows over the same will not be agitated or otherwise obstructed to produce turbulence and vertical currents. The principle of my apparatus is to flow the minerals and water downwardly on a substantially flat surface without the turbulence of the same, so that the heavier particles in the float mass will slowly but surely flow on the extreme bottom of the runway while the lighter materials such as sand and gravel will flow with the water above such heavier substances. It is well known that precious ore such as gold, silver and like is found in black sand, and this black sand by being heavier than the lighter sands, will flow on the bottom of the runway. Also in this mass will be found free gold and gold nuggets which are likewise heavier than the ordinary sand, gravel, dirt and like. Obviously, if riffles or other bars were placed in the runway of my apparatus, the result I obtain would be defeated inasmuch as these riffles or bars would set up a turbulence in the mass which would cause the heavier particles and black sand to move upwardly with such upwardly and downwardly traveling currents mixing the same with the rest of the mass and make impossible the separation of the heavier material from the lighter materials. After the proomtion of the heavier material to flow along the bottom of the runway, the next problem is to remove this material without disturbing it or the mass of material flowing through the device. I have solved this problem by providing the holes, slot openings, and slot 23, 25, 26, and 27 in the plates. By this construction, the heavier material in which the precious minerals are present will flow in the bottom of the mass adjacent the plates and will run into these openings 23, 25, 26, and 27. In actual practice, however, it is found that this heavier material such as black sand, will readily and immediately clog these openings and it is, therefore, necessary to have reciprocating members for keeping these openings open for the reception of the valuable material. I have herebefore explained how the spikes 53, teeth 55, and bar 56 move upwardly and downwardly to clear these receiving openings 23, 25, 26, and 27. This desired recovered material will pass through these openings and into the bottoms of the tanks 14 with a substantial amount of water. If additional water is necessary for the mixing with this recovered material or to prevent caking and clogging of material within the apparatus, the auxiliary water pipes 62 and 63 may be employed as herebefore pointed out. Obviously by the use of these openings in the plates and the keeping of the openings clear, the heavier material will be skimmed off of the bottom of the flow of the mass through the apparatus. Obviously the force of gravity will be present to encourage this desired material to enter the openings and fall into the receiving tanks 14. If desired, this action, however, may be encouraged by a suction pump and in the drawings I show such a suction pump 59 in the main exit pipe line 58 leading from the tanks 14. By such a construction, the heavier materials will be encouraged to pass into the receiving openings by both gravity and suction. From the bottoms of the tanks 14, the desired material will pass through the pipe 15 into the pipe 58, thence into a settling tank, if necessary, and then onto the concentrate table 65. As is well known, the concentrate table will separate and partially classify the gold from the concentrate obtained through the openings in the plate. Any number of plates may be used and various designs of openings can be provided. In the drawing for illustrative purposes only, I show the openings and clearing projections enlarged. In actual practice, the receiving openings are comparatively small. Plates 17 and 18 show small round holes while the plate 19 has a plurality of transversely arranged slot openings. These openings 26 and 27 are capable of receiving larger and heavier materials than the openings 23 and 25. The opening 27 is particularly designed and capable of receiving flattened metallic members. In actual practice, I find that my apparatus is capable of extracting free gold, powdered gold, black sand, nuggets and gold bearing nuggets and particles that have escaped the riffle boards and other retrieving elements of placer mining equipment now in general use. Although I have described my apparatus as particularly adaptable for placer mining, obviously it can be used in other types of mining. Also it will be appreciated that my apparatus can be used for separating other materials than gold provided such materials are heavier than the mass of material from which they come. The undesirable material pases from the plate 20. The speed with which the material passes across and over my plates and between the side walls 21 and 22 will depend upon the amount of material flowing and the angularity of the plates 17, 18, 19 and 20 relative to the horizontal.

Some changes may be made in the construction and arrangement of my improved mineral separator without departing from the real spirit and purpose of my invention, and it is my intention to cover by my claims any modified forms of structure or use of mechanical equivalents which may be reasonably included within their scope.

I claim:

1. In a gravity concentrator, a sluiceway having a bottom comprising a plate having a substantially flat top surface, a plurality of spaced apart groups of holes extending through said plate, a housing enclosing the bottom of said plate in sealed relation therewith, said housing having a discharge pipe opening thereinto, and a suction pipe having a suction pump operatively attached thereto outwardly of said housing, said suction pipe being connected to said discharge pipe to create suction through said holes in said plate.

2. The structure of claim 1, a second pipe opening into said housing, and said second pipe being connected to a source of fluid under pressure.

3. In a gravity concentrator, a sluiceway having a bottom comprising a plate having a substantially flat top surface, at least one group of spaced apart holes extending through said plate, a housing enclosing the bottom of said plate in sealed relation therewith, said housing having a discharge pipe opening thereinto, and a suction pump operatively connected to said discharge pipe outwardly of said housing to create suction through said holes in said plate.

JOSEPH C. SHANNON.